United States Patent
Chen et al.

(10) Patent No.: US 12,365,770 B2
(45) Date of Patent: Jul. 22, 2025

(54) SILICA AEROGEL-CONTAINING POLYESTER MASTERBATCH, METHOD FOR MAKING THE SAME AND SILICA AEROGEL-CONTAINING POLYESTER FIBER MADE FROM THE SAME

(71) Applicant: KCI MASTER INDUSTRIES CORP., Tainan (TW)

(72) Inventors: Yu-Shun Chen, Tainan (TW); Hsiao-Chi Tsai, Tainan (TW); Chun-Ping Cheng, Tainan (TW); Chien-Ming Lin, Tainan (TW); Hsu-Yeh Huang, Tainan (TW)

(73) Assignee: KCI MASTER INDUSTRIES CORP., Tainin (TW)

( * ) Notice: Subject to any disclaimer, the term of this patent is extended or adjusted under 35 U.S.C. 154(b) by 319 days.

(21) Appl. No.: 18/082,662

(22) Filed: Dec. 16, 2022

(65) Prior Publication Data

US 2024/0018313 A1 Jan. 18, 2024

(30) Foreign Application Priority Data

Jul. 15, 2022 (TW) .................................. 111126655

(51) Int. Cl.
*C08J 3/22* (2006.01)
*C08K 7/26* (2006.01)
*D01F 8/14* (2006.01)

(52) U.S. Cl.
CPC ..................... *C08J 3/22* (2013.01); *C08K 7/26* (2013.01); *D01F 8/14* (2013.01); *C08J 2367/03* (2013.01); *C08K 2201/005* (2013.01); *D10B 2331/04* (2013.01)

(58) Field of Classification Search
CPC ...... C08J 3/22; C08J 2367/03; C08J 2467/02; C08J 3/226; C08J 3/223; D01F 8/14; D01F 1/106; D01F 6/62; D01F 1/10; D01F 6/92; D10B 2331/04; C08L 67/02

USPC ........................................................... 523/351
See application file for complete search history.

(56) References Cited

U.S. PATENT DOCUMENTS

2021/0301124 A1* 9/2021 Yang ....................... C08L 67/02

FOREIGN PATENT DOCUMENTS

| TW | 201710086 A | 3/2017 |
| TW | 202138652 A | 10/2021 |

OTHER PUBLICATIONS

English Translation of CN 110305340 (Year: 2019).*
Search Report appended to an Office Action, which was issued to Taiwanese counterpart application No. 111141555 by the TIPO on May 10, 2023, with an English translation thereof.

* cited by examiner

*Primary Examiner* — Hannah J Pak
(74) *Attorney, Agent, or Firm* — Osha Bergman Watanabe & Burton LLP (57) ABSTRACT

A silica aerogel-containing polyester masterbatch includes a polyethylene terephthalate resin, a silica aerogel powder, and a dispersing agent. The silica aerogel powder is dispersed in the polyethylene terephthalate resin, and is present in an amount ranging from 5 wt % to 30 wt % based on 100 wt % of the silica aerogel-containing polyester masterbatch. The dispersing agent is dispersed in the polyethylene terephthalate resin, is selected from the group consisting of a paraffin oil, a silane compound, a wax including $C_{28}$-$C_{32}$ straight chain monoacids, and combinations thereof, and is present in an amount ranging from 0.1 wt % to 4.0 wt % based on 100 wt % of the silica aerogel-containing polyester masterbatch. A method for preparing the silica aerogel-containing polyester masterbatch, and a silica aerogel-containing polyester fiber made from the same are also disclosed.

6 Claims, 4 Drawing Sheets

SILICA AEROGEL-CONTAINING POLYESTER MASTERBATCH, METHOD FOR MAKING THE SAME AND SILICA AEROGEL-CONTAINING POLYESTER FIBER MADE FROM THE SAME

CROSS-REFERENCE TO RELATED APPLICATION

This application claims priority to Taiwanese Invention Patent Application No. 111126655, filed on Jul. 15, 2022.

FIELD

The present disclosure relates to a polyester masterbatch, and more particularly to a silica aerogel-containing polyester masterbatch. The present disclosure also relates to a method for making the silica aerogel-containing polyester masterbatch, and a silica aerogel-containing polyester fiber.

BACKGROUND

Polyester is a polymeric material that is widely used for making polyester products, e.g., polyester cotton, polyester fiber, polyester pellets, polyester film, polyester bottle, etc. In a method for manufacturing a polyester product, a polyester material serving as a base and functional additives with specific functions are subjected to a granulation process so as to form a polyester masterbatch with specific functions, and then the polyester masterbatch are subjected to further processing so as to obtain the polyester product having specific functions. The processability of the polyester masterbatch and the functional properties of the resultant polyester product are determined by the evenly mixing of the polyester material and the functional additives during formation of the polyester masterbatch.

For example, in a conventional method for manufacturing a polyester textile product with heat insulation property, a mixture containing a polyester material and a silica aerogel powder with heat insulation property is subjected to a granulation process so as to form a silica aerogel-containing polyester masterbatch with heat insulation property. However, since the polyester material that is relatively polar and the silica aerogel powder that is relatively non-polar are incompatible with each other, the polyester material and the silica aerogel powder cannot be evenly mixed, causing the resultant silica aerogel-containing polyester masterbatch having a poor spinnability, and a silica aerogel-containing polyester fiber made from the silica aerogel-containing polyester masterbatch having an undesirable heat insulation property.

SUMMARY

Therefore, a first object of the present disclosure is to provide a method for preparing a silica aerogel-containing polyester masterbatch which can alleviate at least one of the drawbacks of the prior art.

The method includes the steps of:
(a) subjecting a mixture of a silica aerogel powder, a dispersing agent, and a liquid carrier to a ball-milling treatment, so as to form a silica aerogel-containing composite dispersion liquid;
(b) subjecting the silica aerogel-containing composite dispersion liquid to a drying treatment, so as to form a silica aerogel-containing composite powder; and
(c) subjecting the silica aerogel-containing composite powder and a polyethylene terephthalate resin to a granulation process, so as to obtain the silica aerogel-containing polyester masterbatch.

In the method for preparing the silica aerogel-containing polyester masterbatch, the dispersing agent is selected from the group consisting of a paraffin oil, a silane compound, a wax including $C_{28}$-$C_{32}$ straight chain monoacids, and combinations thereof, and is present in an amount ranging from 1 part by weight to 50 parts by weight based on 100 parts by weight of the silica aerogel powder. The silica aerogel-containing composite powder is present in an amount ranging from 5 parts by weight to 45 parts by weight based on 100 parts by weight of the polyethylene terephthalate resin.

A second object of the present disclosure is to provide a silica aerogel-containing polyester masterbatch which can alleviate at least one of the drawbacks of the prior art.

The silica aerogel-containing polyester masterbatch includes a polyethylene terephthalate resin, a silica aerogel powder, and a dispersing agent. The silica aerogel powder is dispersed in the polyethylene terephthalate resin, and is present in an amount ranging from 5 wt % to 30 wt % based on 100 wt % of the silica aerogel-containing polyester masterbatch. The dispersing agent is dispersed in the polyethylene terephthalate resin, is selected from the group consisting of a paraffin oil, a silane compound, a wax including $C_{28}$-$C_{32}$ straight chain monoacids, and combinations thereof, and is present in an amount ranging from 0.1 wt % to 4.0 wt % based on 100 wt % of the silica aerogel-containing polyester masterbatch.

A third object of the present disclosure is to provide a silica aerogel-containing polyester fiber, which can alleviate at least one of the drawbacks of the prior art, and which is made from the abovementioned silica aerogel-containing polyester masterbatch.

BRIEF DESCRIPTION OF THE DRAWINGS

Other features and advantages of the present disclosure will become apparent in the following detailed description of the embodiment(s) with reference to the accompanying drawings. It is noted that various features may not be drawn to scale.

DETAILED DESCRIPTION

For the purpose of this specification, it will be clearly understood that the word "comprising" means "including but not limited to", and that the word "comprises" has a corresponding meaning.

It is to be understood that, if any prior art publication is referred to herein, such reference does not constitute an admission that the publication forms a part of the common general knowledge in the art, in Taiwan or any other country.

Unless otherwise defined, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

The present disclosure provides a method for preparing a silica aerogel-containing polyester masterbatch which includes the following steps (a) to (c).

In step (a), a mixture of silica aerogel powder, a dispersing agent, and a liquid carrier is subjected to a ball-milling treatment, so as to form a silica aerogel-containing composite dispersion liquid.

In step (b), the silica aerogel-containing composite dispersion liquid is subjected to a drying treatment, so as to form a silica aerogel-containing composite powder.

In step (c), the silica aerogel-containing composite powder and a polyethylene terephthalate resin are subjected to a granulation process, so as to obtain the silica aerogel-containing polyester masterbatch.

According to the present disclosure, the dispersing agent serves as a surfactant and physically interacts with the silica aerogel powder to promote dispersion of the silica aerogel powder without formation of aggregates or sediments in the silica aerogel-containing composite dispersion liquid, so as to allow the polyethylene terephthalate resin and the silica aerogel-containing composite dispersion powder to be evenly mixed in the granulation process, and to allow the silica aerogel powder to be dispersed in the silica aerogel-containing polyester masterbatch. The dispersing agent may be selected from the group consisting of a paraffin oil, a silane compound, a wax including $C_{28}$-$C_{32}$ straight chain monoacids, and combinations thereof. The wax including $C_{28}$-$C_{32}$ straight chain monoacids may be a wax product that is commercially available, e.g., Montan wax, but is not limited thereto. The paraffin oil may be purchased commercially. The silane compound may be a silane product that is commercially available, e.g., n-tetrasilane, isotetrasilane, and n-pentasilane, but is not limited thereto. The dispersing agent may be present in an amount ranging from 1 part by weight to 50 parts by weight based on 100 parts by weight of the silica aerogel powder. When the dispersing agent is present in an amount of less than 1 part by weight based on 100 parts by weight of the silica aerogel powder, dispersion of the silica aerogel powder in the silica aerogel-containing composite dispersion liquid will be poor. When the dispersing agent is present in an amount greater than 50 parts by weight based on 100 parts by weight of the silica aerogel powder, the efficiency of the ball-milling treatment would be reduced due to excessive lubrication, thereby reducing the dispersion of the silica aerogel powder in the silica aerogel-containing composite dispersion liquid and causing wastage of the dispersing agent. In certain embodiments, the dispersing agent is present in an amount ranging from 5 parts by weight to 35 parts by weight based on 100 parts by weight of the silica aerogel powder.

It should be noted that by using the dispersing agent of the aforesaid specific type and the aforesaid specific amount range, the silica aerogel powder is not particularly limited to be a hydrophilic silica aerogel powder or a hydrophobic silica aerogel powder, that is, the hydrophilic silica aerogel powder or the hydrophobic silica aerogel powder allows the silica aerogel-containing composite powder to be evenly mixed with the polyethylene terephthalate resin.

In certain embodiments, in step (a), in order to allow the liquid carrier and the silica aerogel powder to be more evenly mixed and less likely to undergo phase separation, the liquid carrier having hydrophilic or hydrophobic property may be selected according to the silica aerogel powder, which may be a hydrophilic silica aerogel powder or a hydrophobic silica aerogel powder, so that the liquid carrier and the silica aerogel powder are correlated with each other in terms of hydrophilicity or hydrophobicity thereof. That is, when the silica aerogel powder is a hydrophilic silica aerogel powder, the liquid carrier having hydrophilic property is selected accordingly; and when the silica aerogel powder is a hydrophobic silica aerogel powder, the liquid carrier having hydrophobic property is selected accordingly.

Since the polyethylene terephthalate resin are generally hydrophilic, in certain embodiments, the silica aerogel powder is a hydrophilic silica aerogel powder, and the liquid carrier has hydrophilic property, so as to allow the silica aerogel-containing composite powder to be evenly mixed with the polyethylene terephthalate resin. In certain embodiments, the liquid carrier is selected from the group consisting of water, alcohol, acetone, butanone, isopropyl alcohol, ethylene glycol, and combinations thereof.

In certain embodiments, the liquid carrier is present in an amount ranging from 1000 parts by weight to 4000 parts by weight based on 100 parts by weight of the silica aerogel powder, so that the ball-milling treatment can be conducted efficiently. In other embodiments, the liquid carrier is present in an amount ranging from 1500 parts by weight to 3500 parts by weight based on 100 parts by weight of the silica aerogel powder.

According to the present disclosure, the ball-milling treatment allows the silica aerogel powder, the dispersing agent and the liquid carrier to be more evenly mixed. To be specific, the ball-milling treatment is conducted to grind the mixture containing silica aerogel powder, the dispersing agent and the liquid carrier using a ball mill and a plurality of ball-milling beads. An example of the ball-milling beads may be, zirconia beads, but is not limited thereto. In certain embodiments, the ball-milling beads have an average particle size ranging from 0.5 mm to 5 mm. In certain embodiments, the ball-milling treatment may be conducted at a temperature ranging from 10° C. to 60° C. In certain embodiments, the ball-milling treatment may be conducted at a speed ranging from 10 rpm to 1900 rpm, but is not limited thereto. In certain embodiments, the ball-milling treatment may be conducted for a time period ranging from 10 hours to 72 hours, but is not limited thereto.

In step (b), the drying treatment is conducted to remove the liquid carrier from the silica aerogel-containing composite dispersion liquid. In certain embodiments, the drying treatment may be conducted at a temperature ranging from 110° C. to 130° C., but is not limited thereto. In certain embodiments, the drying treatment may be conducted for a time period ranging from 24 hours to 72 hours, but is not limited thereto.

In step (c), the properties of the polyethylene terephthalate resin, for example, molecular weight, viscosity, crystallinity, etc., are not particularly limited. The polyethylene terephthalate resin may be flexibly selected and adjusted according to practical requirements. The polyethylene terephthalate resin may be purchased commercially, but is not limited thereto. The silica aerogel-containing composite powder may be present in an amount ranging from 5 parts by weight to parts by weight based on 100 parts by weight of the polyethylene terephthalate resin. When the silica aerogel-containing composite powder is present in an amount of less than 5 parts by weight based on 100 parts by weight of the polyethyelene terephthalate resin, the thermal insulation property of the silica aerogel-containing polyester masterbatch will be poor. When the silica aerogel-containing composite powder is present in an amount of greater than 45 parts by weight based on 100 parts by weight of the polyethyelene terephthalate resin, the processability of the silica aerogel-containing polyester masterbatch will be poor. In certain embodiments, the silica aerogel-containing composite powder is present in an amount ranging from 5 parts by weight to 20 parts by weight based on 100 parts by weight of the polyethylene terephthalate resin.

The granulation process is conducted to allow the silica aerogel-containing composite powder and the polyethylene terephthalate resin to be more evenly mixed, so that the resultant silica aerogel-containing polyester masterbatch has a regular shape. The equipment and conditions for conducting the granulation process are not particularly limited. In certain embodiments, the granulation process may be conducted at a temperature ranging from 220° C. to 310° C., but is not limited thereto. In certain embodiments, the granulation process may be conducted for a time period ranging from 1 second to 180 seconds, but is not limited thereto.

The present disclosure also provides the silica aerogel-containing polyester masterbatch which includes the polyethylene resin, the silica aerogel powder dispersed in the polyethylene terephthalate resin, and the dispersing agent dispersed in the polyethylene terephthalate resin.

The details of the polyethylene terephthalate resin, the silica aerogel powder, and the dispersing agent are as described in the foregoing, and are not repeated herein. The dispersing agent may be present in an amount ranging from 0.1 wt % to 4.0 wt % based on 100 wt % of the silica aerogel-containing polyester masterbatch. When the dispersing agent is present in an amount of less than 0.1 wt % based on 100 wt % of the silica aerogel-containing polyester masterbatch, the silica aerogel powder will not be evenly dispersed in the polyethylene terephthalate resin. When the dispersing agent is present in an amount of greater than 4.0 wt % based on 100 wt % of the silica aerogel-containing polyester masterbatch, not only the dispersion of the silica aerogel powder in the polyethylene terephthalate resin is not significantly improved, but also leads to wastage of the dispersing agent.

According to the present disclosure, the silica aerogel powder can be evenly dispersed in the polyethylene terephthalate resin by physically interacting with the dispersing agent, so that the resultant silica aerogel-containing polyester masterbatch has good processability and good thermal insulation property. The silica aerogel powder may be present in an amount ranging from 5 wt % to 30 wt % based on 100 wt % of the silica aerogel-containing polyester masterbatch. When the silica aerogel powder is present in an amount of less than wt % based on 100 wt % of the silica aerogel-containing polyester masterbatch, the thermal insulation property of the silica aerogel-containing polyester masterbatch will be poor. When the silica aerogel powder is present in an amount of greater than 30 wt % based on 100 wt % of the silica aerogel-containing polyester masterbatch, the silica aerogel-containing polyester masterbatch will have poor processability. In certain embodiments, the silica aerogel powder is present in an amount ranging from 5 wt % to 15 wt % based on 100 wt % of the silica aerogel-containing polyester masterbatch.

In certain embodiments, the silica aerogel powder has an average particle size ranging from 2 μm to 5 μm, such that the silica aerogel-containing polyester masterbatch has an improved processability and an improved thermal insulation property.

Since the silica aerogel-containing polyester masterbatch has a good processability, such silica aerogel-containing polyester masterbatch is suitable to be subjected to any conventional processing techniques so as to manufacture silica aerogel-containing polyester products, such as silica aerogel-containing polyester sheet, silica aerogel-containing polyester board, silica aerogel-containing polyester membrane, silica aerogel-containing polyester bottles, polyester fiber, etc., and the thus manufactured silica aerogel-containing polyester products have a good thermal insulation property. Therefore, the present disclosure also provides a silica aerogel-containing polyester fiber, which is made from the silica aerogel-containing polyester masterbatch. In an exemplary embodiment, the silica aerogel-containing polyester fiber is made by subjecting the silica aerogel-containing polyester masterbatch to a spinning process, and has a good thermal insulation property.

The present disclosure will be described by way of the following examples. However, it should be understood that the following examples are intended solely for the purpose of illustration and should not be construed as limiting the present disclosure in practice.

EXAMPLES

Preparation of Silica Aerogel-Containing Polyester Masterbatch

Example 1 (EX1)

First, a silica aerogel-containing mixture which includes 100 parts by weight of a silica aerogel powder (Specific type: hydrophilic silica aerogel powder; Manufacturer: Rayoung Chemtech Inc.; Product no.: Z1), 10 parts by weight of a dispersing agent (Specific type: paraffin oil; Source: Pho Yuan Chemicals Co. Ltd.), and 1800 parts by weight of a liquid carrier (Specific type: water) was added into a ball mill (Manufacturer: Tai Yiaeh Industrial Co. Ltd.; Model no.: YTN-100), and then 1000 parts by weight (as total weight) of zirconia beads (Manufacturer: Kallex Co. Ltd.) each having a particle size of 1 mm were added into the ball mill, followed by subjecting the silica aerogel-containing mixture and the zirconia beads to a ball-milling treatment at a temperature of 25° C. and a rotation speed of 200 rpm for 24 hours. Thereafter, a silica aerogel-containing composite dispersion liquid obtained by grinding of the mixture was poured out from the ball mill, while the zirconia beads were kept in the ball mill.

Next, the silica aerogel-containing composite dispersion liquid was placed in an oven and then subjected to a drying treatment at 110° C. for 72 hours, so as to obtain a silica aerogel-containing composite powder.

Afterwards, 100 parts by weight of a polyethylene terephthalate resin (Manufacturer: Shinkong Synthetic Fibers Cooperation; Product no.: 5015W) and 11 parts by weight of the silica aerogel-containing composite powder were placed in a twin-screw granulator (Manufacturer: Chang Yi Extrusion Machinery Co. Ltd.; Model no.: CYM1) to be mixed, and then subjected to a granulation process conducted at 300° C., so as to obtain a silica aerogel-containing polyester masterbatch of EX1.

Examples 2 to 5 (EX2 to EX5)

The method for preparing the silica aerogel-containing polyester masterbatches of EX2 to EX5 were substantially similar to that of EX1, except for the differences in the type and amount of the dispersing agent, the amount of the liquid carrier, and the amount of the silica aerogel-containing composite powder, as shown in Table 1 below. To be specific, for the type of dispersing agent, 15 parts by weight of paraffin oil was used in EX2, 20 parts by weight of montan wax (Manufacturer: Clariant GmbH, Germany) was used in EX3, 25 parts by weight of montan wax was used in EX4, and a combination of 15 parts by weight of paraffin oil and 15 parts by weight of montan wax was used in EX5.

Comparative Example 1 (CE1)

The method for preparing the silica aerogel-containing polyester masterbatch of CE1 were substantially similar to that of EX1, except that the dispersing agent is omitted from the silica aerogel-containing mixture.

Property Evaluation

The composition of the silica aerogel-containing polyester masterbatches of EX1 to EX5 and CE1 was determined as follows. First, a respective one of the silica aerogel-containing polyester masterbatches of EX1 to EX5 and CE1 was subjected to weight measurement so as to obtain a weight before baking (i.e., W1). Next, the silica aerogel-containing polyester masterbatch was subjected to a baking process in a high-temperature furnace at 600° C. for 6 hours, such that during the baking process, organic matter (i.e., the polyethylene terephthalate resin and the paraffin oil) was subjected to pyrolysis while leaving inorganic matter (i.e., the silica aerogel powder) behind, thereby obtaining an inorganic residue. Thereafter, the inorganic residue was subjected to imaging using a scanning electron microscope (Manufacturer: Hitachi, Ltd.; Model no.: SU-8010). After verifying that the inorganic residue originated from the silica aerogel powder, the inorganic residue was subjected to weight measurement so as to obtain a weight of inorganic residue (i.e., W2).

The amount of the silica aerogel powder (i.e., A1) in a respective one of the silica aerogel-containing polyester masterbatches of EX1 to EX5 and CE1, as shown in Table 1 below, was calculated using the following Equation (I):

$$A1 = (W2/W1) \times 100\% \qquad (I)$$

Referring to the aforesaid method for preparing the silica aerogel-containing polyester masterbatch of EX1, since the amount ratio (i.e., parts by weight ratio) of the silica aerogel powder and the dispersing agent in EX1 is 1:0.1, it can be inferred that the amount of the dispersing agent is 0.1 times the amount of the silica aerogel powder, i.e., the amount of the dispersing agent is 1 wt %. Likewise, the amount of the dispersing agent (i.e., A2) in the silica aerogel-containing polyester masterbatch of each of EX2 to EX5 and CE1 can be deduced based on the amount ratio of the silica aerogel powder and the dispersing agent thereof, and is shown in Table 1 below.

The amount of the polyethylene terephthalate resin (i.e., A3) in the respective one of the silica aerogel-containing polyester masterbatches of EX1 to EX5 and CE1, as shown in Table 1 below, was calculated using the following Equation (II):

$$A3 = 100\% - (A1 + A2) \qquad (II)$$

TABLE 1

| | | EX1 | EX2 | EX3 | EX4 | EX5 | CE1 |
|---|---|---|---|---|---|---|---|
| Silica aerogel-containing mixture | Type of silica aerogel powder | Hydrophilic silica aerogel powder | Hydrophilic silica aerogel powder | Hydrophilic silica aerogel powder | Hydrophilic silica aerogel powder | Hydrophilic silica aerogel powder | Hydrophilic silica aerogel powder |
| | Amount of silica aerogel powder (parts by weight) | 100 | 100 | 100 | 100 | 100 | 100 |
| | Type of dispersing agent | Paraffin oil | Paraffin oil | Montan wax | Montan wax | Paraffin oil + Montan wax | — |
| | Amount of dispersing agent (parts by weight) | 10 | 15 | 20 | 25 | 30 | 0 |
| | Type of liquid carrier | Water | Water | Water | Water | Water | Water |
| | Amount of liquid carrier (parts by weight) | 1800 | 1900 | 2200 | 2500 | 3000 | 1800 |
| Amount of polyethylene terephthalate resin (parts by weight) | | 100 | 100 | 100 | 100 | 100 | 100 |
| Amount of silica aerogel-containing composite powder (parts by weight) | | 11 | 11.5 | 12 | 12.5 | 13 | 11 |
| Silica aerogel-containing polyester masterbatch | Amount of polyethylene terephthalate resin (wt %) | 89 | 88.5 | 88 | 87.5 | 87 | 90 |
| | Amount of silica aerogel powder (wt %) | 10 | 10 | 10 | 10 | 10 | 10 |
| | Amount of dispersing agent (wt %) | 1 | 1.5 | 2 | 2.5 | 3 | 0 |

In the method for preparing the respective one of the silica aerogel-containing polyester masterbatches of EX1 to EX5, use of the dispersing agent promotes dispersion of the silica aerogel powder without formation of aggregates or sediments, so as to allow the silica aerogel-containing composite dispersion powder to be evenly mixed with the polyethylene terephthalate resin, and also allows the silica aerogel powder to be evenly dispersed in the polyethylene terephthalate resin in the resultant silica aerogel-containing polyester masterbatch.

In contrast, in the method for preparing the silica aerogel-containing polyester masterbatch of CE1 which omits use of the dispersing agent, formation of aggregates and sediments of the silica aerogel powder cannot be avoided, and mixing of the silica aerogel powder and the liquid carrier for forming the silica aerogel-containing mixture is very poor, causing the silica aerogel powder cannot be evenly dispersed in the polyethylene terephthalate resin in the resultant silica aerogel-containing polyester masterbatch of CE1. Therefore, the silica aerogel-containing polyester masterbatch of CE1 was not subjected to subsequent processing, i.e., spinning process, so as to avoid clogging of the inlet/outlet of a spinning apparatus.

Application Example 1 (AE1)

The silica aerogel-containing polyester masterbatch of EX1 was subjected to a spinning process as described below so as to evaluate the processability and the thermal insulation property thereof.

First, 30 parts by weight of the silica aerogel-containing polyester masterbatch of EX1 and 100 parts by weight of a polyester-based material (Specific type: polyethylene terephthalate resin; Manufacturer: Shinkong Synthetic Fibers Cooperation; Product no.: 5015W) were subjected to a granulation process so as to obtain a silica aerogel-containing polyester. Next, the silica aerogel-containing polyester is subjected to a melt-spinning process using a spinning apparatus (Manufacturer: Huei Yang Machine Co. Ltd.; Model no.: HYM) at a temperature of 275° C. and a speed of 3000 m/min, so as to obtain a plurality of silica aerogel-containing polyester fibers. Thereafter, the silica aerogel-containing polyester fibers were woven using a weaving machine (Manufacturer: Fu Tai Textile Co. Ltd.; Model no.: ZW405), so as to obtain a silica aerogel-containing polyester fabric of AE1. Afterwards, the silica aerogel-containing polyester fabric of AE1 was subjected to imaging using the scanning electron microscope (Manufacturer: Hitachi, Ltd.; Model no.: SU-8010), in which appearance of the silica aerogel-containing polyester fibers of the silica aerogel-containing polyester fabric of AE1 was observed, and the diameter of cross section thereof and particle size of the silica aerogel powder therein were determined. The results are shown in FIGS. 1 to 4.

Figure 1:
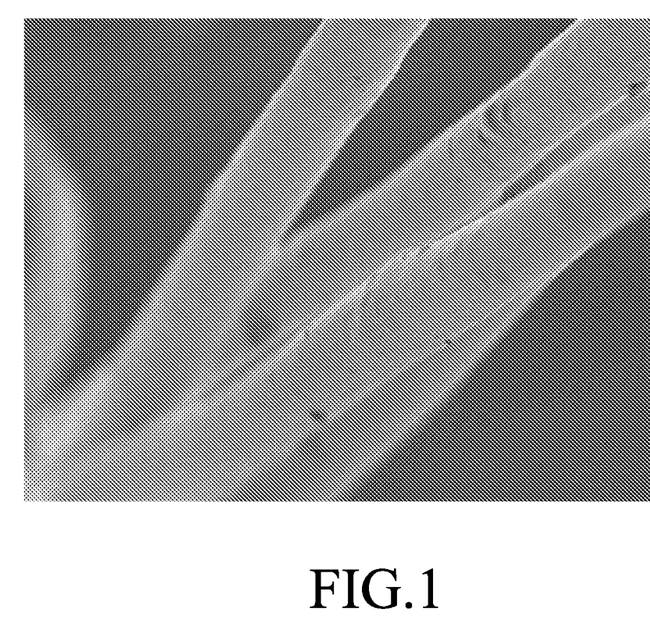
FIG. 1 is a scanning electron microscope (SEM) image illustrating a plurality of silica aerogel-containing polyester fibers made from a silica aerogel-containing polyester masterbatch of Example 1 (EX1).
Figure 2:
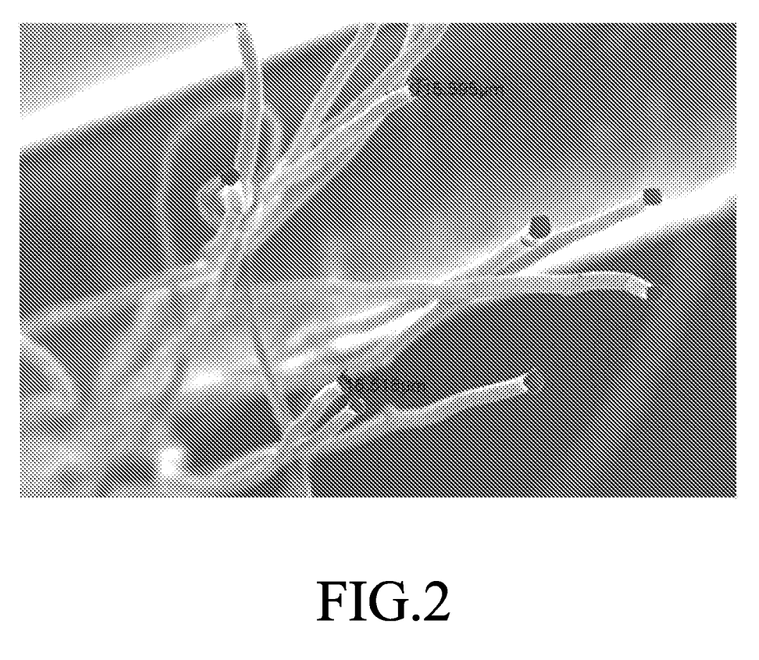
FIG. 2 is an SEM image illustrating the diameter of cross section of the silica aerogel-containing polyester fibers made from the silica aerogel-containing polyester masterbatch of EX1.
Figure 3:
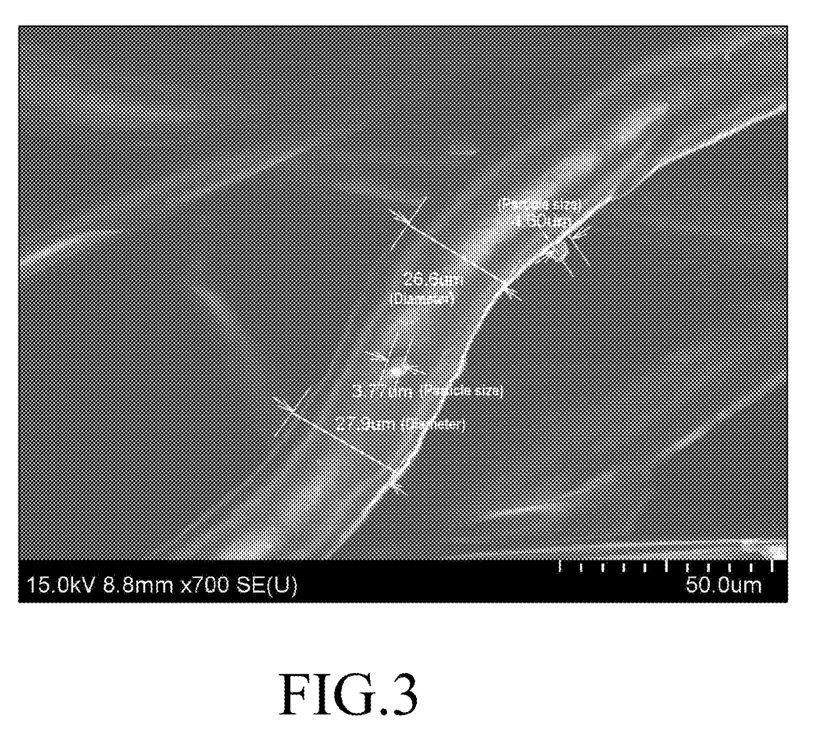
FIG. 3 is an SEM image illustrating the diameter of the silica aerogel-containing polyester fibers made from the silica aerogel-containing polyester masterbatch of EX1 and the particle size of the silica aerogel powder.
Figure 4:
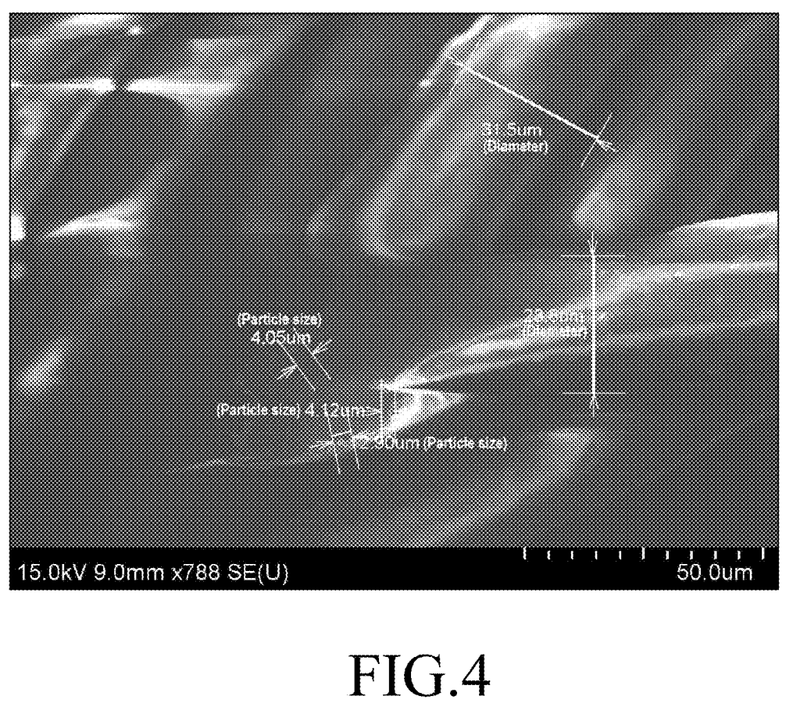
FIG. 4 is an SEM image illustrating, at an oblique angle of 45°, the diameter of cross-section of the silica aerogel-containing polyester fibers made from the silica aerogel-containing polyester masterbatch of EX1 and the particle size of the silica aerogel powder.

FIGS. 1 to 3 are scanning electron microscope images respectively illustrating the silica aerogel-containing polyester fibers made from the silica aerogel-containing polyester masterbatch of EX1 which have good appearance, whereas FIG. 4 is another scanning electron microscope image illustrating cross section of the silica aerogel-containing polyester fibers taken at an oblique angle of 45°. As clearly shown in FIGS. 1 to 3, the surface of the silica aerogel-containing polyester fibers has a plurality of protrusions formed by the silica aerogel powder, while the silica aerogel powder was observed in the cross-sectional view of the silica aerogel-containing polyester fibers as shown in FIG. 4. Referring again to FIGS. 2 to 4, the average particle size of the silica aerogel powder ranges from 2.9 μm to 4.6 μm, while the diameter of the cross section of the silica aerogel-containing polyester fiber (i.e., the diameter of the monofilament) ranges from 15.5 μm to 31.5 μm.

In addition, the silica aerogel-containing polyester fabric of AE1 was subjected to thermal conductivity measurement which was conducted using a thermal conductivity analyzer (Manufacturer: Hot Disk Instruments; Model no.: Transient Plane Source 3500) in combination with a sensor (Manufacturer: Hot Disk Instruments; Model no.: C7577; radius: 2.001 mm), and which was conducted at a temperature of 25° C., a power of 5 mW, a time period of 2 seconds and a thermal conductivity ranging from 0.03 W/mK to 500 W/mK, in accordance to the procedures set forth in ISO 22007-2 "Plastics—Determination of thermal conductivity and thermal diffusivity—Part 2: Transient plane heat source (hot disc) method (2008 edition)". The result showed that the silica aerogel-containing polyester fabric of AE1 has a very low thermal conductivity, which is determined to be 0.04917 W/mK, indicating that the silica aerogel-containing polyester fabric of AE1 has a good thermal insulation property and can be applied as a thermal-insulating fabric or a flame-retardant fabric.

The aforesaid results demonstrate that by using the type and amount of the dispersing agent and also the amount of the silica aerogel-containing composite powder of EX1, the silica aerogel powder can be evenly dispersed in the polyethylene terephthalate resin in the resultant silica aerogel-containing polyester masterbatch of EX1, so that the silica aerogel-containing polyester masterbatch of EX1 has good spinnability and thermal insulation property, such that problems such as broken filaments and clogging of the inlet/outlet of the spinning apparatus occurring during the spinning process can be avoided, and thus, the silica aerogel-containing polyester masterbatch of EX1 can be smoothly spun to form the silica aerogel-containing polyester fibers having good thermal insulation property.

It should be noted that the silica aerogel-containing polyester masterbatch of the present disclosure is not limited to be subjected to the spinning process, and can be subjected to other subsequent process, such as injection molding, extrusion molding, etc., so as to form silica aerogel-containing polyester products, e.g., silica aerogel-containing polyester sheet, silica aerogel-containing polyester board, silica aerogel-containing polyester membrane, silica aerogel-containing polyester bottle, etc.

In summary, the method for preparing the silica aerogel-containing polyester masterbatch of the present disclosure allows the silica aerogel-containing composite powder to be evenly mixed with the polyethylene terephthalate resin, so that in the silica aerogel-containing polyester masterbatch of the present disclosure, the silica aerogel powder can be evenly dispersed with the polyethylene terephthalate resin, resulting in the silica aerogel-containing polyester masterbatch of the present disclosure having a good processability. In addition, by subjecting the silica aerogel-containing polyester masterbatch of the present disclosure to a subsequent process, e.g., the spinning process, so as to form the silica aerogel-containing polyester fibers which have good thermal insulation property, the resultant silica aerogel-containing polyester product made from such silica aerogel-containing polyester fibers also has a good thermal insulation property.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for preparing a silica aerogel-containing polyester masterbatch, comprising the steps of:
   (a) subjecting a mixture of a silica aerogel powder, a dispersing agent, and a liquid carrier to a ball-milling treatment, so as to form a silica aerogel-containing composite dispersion liquid,
   wherein the dispersing agent is selected from the group consisting of a paraffin oil, a silane compound, a wax including $C_{28}$-$C_{32}$ straight chain monoacids, and combinations thereof, and is present in an amount ranging from 1 part by weight to 50 parts by weight based on 100 parts by weight of the silica aerogel powder;
   (b) subjecting the silica aerogel-containing composite dispersion liquid to a drying treatment, so as to form a silica aerogel-containing composite powder; and
   (c) subjecting the silica aerogel-containing composite powder and a polyethylene terephthalate resin to a granulation process, so as to obtain the silica aerogel-containing polyester masterbatch,
   wherein the silica aerogel-containing composite powder is present in an amount ranging from 5 parts by weight to 45 parts by weight based on 100 parts by weight of the polyethylene terephthalate resin.

2. The method as claimed in claim 1, wherein the dispersing agent is present in an amount ranging from 5 parts by weight to 35 parts by weight based on 100 parts by weight of the silica aerogel powder.

3. The method as claimed in claim 1, wherein the silica aerogel-containing composite powder is present in an amount ranging from 5 parts by weight to 20 parts by weight based on 100 parts by weight of the polyethylene terephthalate resin.

4. The method as claimed in claim 1, wherein the silica aerogel powder is a hydrophilic silica aerogel powder, and the liquid carrier has hydrophilic property.

5. The method as claimed in claim 4, wherein the liquid carrier is selected from the group consisting of water, alcohol, acetone, butanone, isopropyl alcohol, ethylene glycol, and combinations thereof.

6. The method as claimed in claim 1, wherein the liquid carrier is present in an amount ranging from 1000 parts by weight to 4000 parts by weight based on 100 parts by weight of the silica aerogel powder.

* * * * *